United States Patent [19]
Evans

[11] 3,966,480
[45] June 29, 1976

[54] LOW DENSITY SLEEVE

[75] Inventor: James D. Evans, Johnstown, Pa.

[73] Assignee: Swank Refractories Company, Inc., Johnstown, Pa.

[22] Filed: Dec. 30, 1974

[21] Appl. No.: 537,063

[52] U.S. Cl. .............................. 106/40 R; 106/41; 106/67
[51] Int. Cl.² ......................................... C04B 21/06
[58] Field of Search .................... 106/67, 41, 40 R

[56] References Cited
UNITED STATES PATENTS

| | | | |
|---|---|---|---|
| 2,499,229 | 2/1950 | Rankine | 106/41 |
| 2,688,558 | 9/1954 | Rankine | 106/41 |
| 3,591,393 | 7/1971 | Rankine | 106/41 |

*Primary Examiner*—J. Poer
*Attorney, Agent, or Firm*—Webb, Burden, Robinson & Webb

[57] ABSTRACT

A low density, refractory stopper rod sleeve has a substantially imperforate surface and a core containing a plurality of randomly spaced, internal and discontinuous small voids. The density of the sleeve is less than 2.0 gr./cc and the preferred density range is 1.60 to 1.85 gr./cc. The sleeve is made up of six parts by volume refractory clay mix to four parts of a combustible waste material such as wet sawdust which does not exceed a screen size of 10 mesh. The sleeves are made by the stiff mud process which includes extruding the mix into solid, cylindrical blanks and forming the blanks in a die in which the final sleeve is slidably disengaged from the die. After drying the sleeve is processed through a normal firing cycle until it reaches approximately 1500°F at which time it is held for a prolonged period of time to drive off the carbonaceous material associated with the waste combustible in the mix.

4 Claims, 1 Drawing Figure

U.S. Patent   June 29, 1976   3,966,480
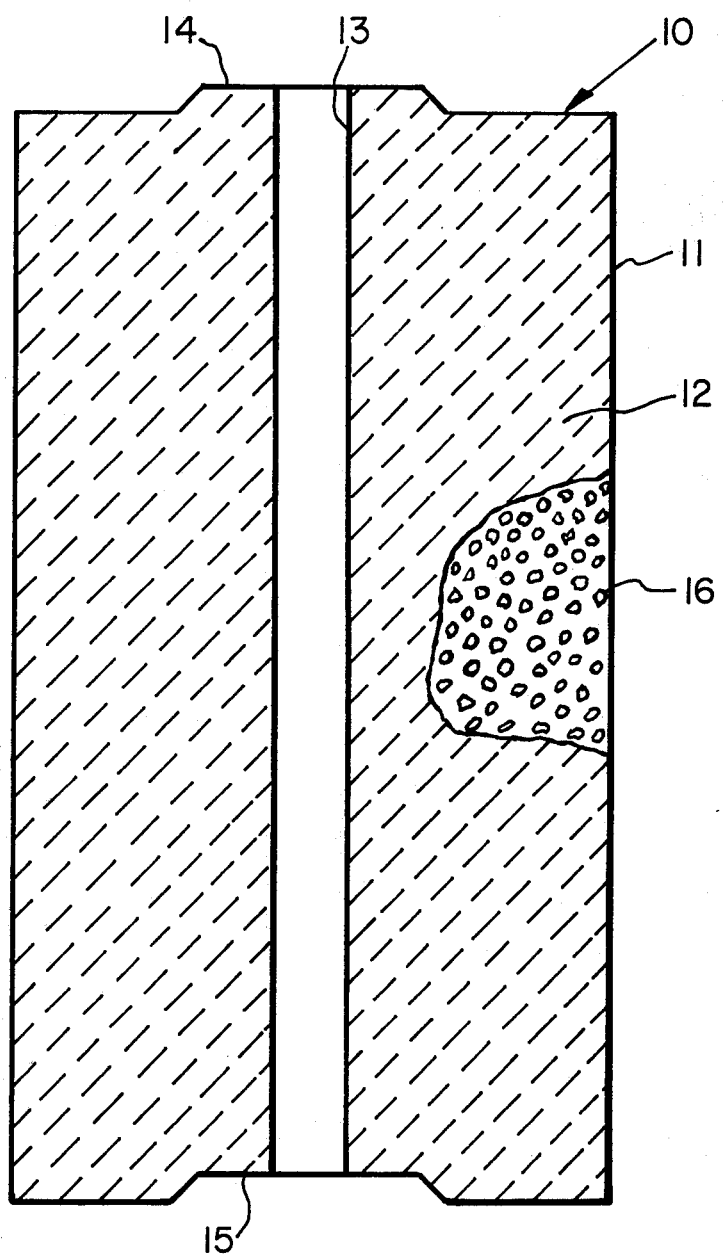

LOW DENSITY SLEEVE

FIELD OF THE INVENTION

This invention relates to stopper rod sleeves and, more particularly, to low density stopper rod sleeves.

DESCRIPTION OF THE PRIOR ART

Most bottom pour ladles in the steel industry are controlled by means of stopper rods which extend from a gooseneck arrangement above a ladle into the ladle adjacent the nozzle seat in the bottom thereof. These stopper rods are made of steel and are protected from the molten metal by means of refractory sleeves positioned in end to end relationship over the stopper rods.

These sleeves require high resistance to thermal spalling, shock resistance to molten steel temperatures, resistance to metal erosion, and resistance to corrosion by the slag which floats to the top of the molten metal in the ladle. With the advent of continuous casting, the various requirements for these sleeves have increased due to the increased exposure time brought about by holding molten metal in the ladles prior to teeming the ladles into the tundish of the continuous caster. The extreme of this condition comes about in what is called the "piggyback" ladle movement. The term "piggyback" means that a ladle of molten metal is held adjacent the tundish so it may be continuously supplied with molten metal and, therefore, the continuous caster need not shut down between heats of steel.

Standard sleeves are normally quite dense having a bulk density from 2.06 to 2.30 gr./cc. The sleeves are normally made of plastic clays combined with flint clays and sleeve grog, which is the rejected burned sleeve material from previous batches. Slightly more dense sleeves are obtained by using high alumina raw materials, i.e. bauxite.

Low density sleeves have not been employed heretofore because the increased porosity was believed to create a network of voids which permitted the molten metal and the slag to deeply penetrate into the sleeve thereby detrimentally overheating the stopper rod and destroying the very purpose for which the sleeve is used, namely protecting the stopper rod. Therefore, attempts to prolong the protection afforded the stopper rod have involved increasing the density of the sleeve member, purportedly to increase the resistance to the various properties set forth hereinabove and deemed essential.

SUMMARY OF THE INVENTION

The object of my invention is to improve the insulating properties of the stopper rod sleeve by lowering the density thereof without sacrificing the necessary resistance to erosion, corrosion, thermal shock and thermal spalling.

It is further an object of my invention to decrease the overall weight of the sleeves thereby making them more economic to transport and easier to handle during installation.

My stopper rod sleeve has a substantially imperforate surface and a core containing a plurality of randomly spaced, internal and discontinuous small voids. The density is less than 2.0 gr./cc and is preferably 1.60 to 1.85 gr./cc. The sleeve is preferably formed of about six parts by volume refractory clay mix to about four parts of a low temperature combustible waste material, preferably hardwood sawdust. The sleeves must be processed by the stiff mud process which includes thorough mixing, extrusion into solid blanks and subsequent formation in dies followed by a slidable disengagement with the die surface. The burning of the sleeves requires a prolonged holding at about 1500°F to completely burn out the sawdust and form the voids through the elimination of the carbonaceous ingredients of the sawdust.

BRIEF DESCRIPTION OF THE DRAWING

The sole FIGURE is a section through a refractory sleeve showing a fragmentary illustrative microsection of a portion of the sleeve.

DESCRIPTION OF THE PREFERRED EMBODIMENTS

The preferred composition for my low density sleeve includes six parts of a standard clay mix combined with four parts of a moistened and screened hardwood sawdust. The standard clay mix includes a majority proportion of a plastic fireclay mixed with a flint clay and sleeve grog from previous burned sleeves. These clays are utilized in volume ratio of approximately five parts plastic clay to three parts flint clay to one part grog.

I prefer using a low temperature combustible such as sawdust to provide the voids in the core of the sleeve. This sawdust must be screened to eliminate the large particles and must thereafter be thoroughly moistened so that it does not absorb the moisture of the plastic fireclay binder in the clay mix.

The clays and the sawdust must be thoroughly mixed so that the fines of the clay work their way to the surface of the mix. This is important since the subsequent extrusion operations move the fines along the sleeve surface so as to fill in and cover any areas temporarily filled by the sawdust particles. By maintaining the fines along the sleeve surface, a substantially imperforate surface is formed during burning and the voids formed by burning off the sawdust are within the core section of the sleeve. This then minimizes penetration of the molten metal into the core of the sleeve. The standard dry process normally considered an acceptable alternate to the stiff mud process is not acceptable since the sleeve surface is not imperforate to the same degree as are the sleeves made by the stiff mud process.

My sleeves are processed as follows. The clay materials are ground and screened separately so as to have a coarseness not exceeding 10 mesh on the Tyler screen standard. In a similar manner the sawdust is screened so as not to exceed 10 mesh and it is thereafter moistened quite freely so that it will not absorb water from the plastic fireclay which forms the binder for the sleeve.

All four ingredients are then thoroughly mixed to assure that the fines work their way to the surface. I have found that the mixing is critical and a greater amount of mixing than normally employed is required. From the mixer the mix is deaired in a standard vacuum chamber and is thereafter extruded in a die into cylindrical solid blanks. The blanks are then inserted into a press and formed into the sleeve. During the ejection of the blank from the die the blank is slidably moved out of the die so that the fines at the surface cover any sawdust particles that may have been positioned thereat. The sleeves are then dried at ambient temperature or by controlled temperature and humidity apparatus before being placed in the kiln for firing.

The firing of the dried sleeves differs from standard processing in that a prolonged heating is required at about 1500°F to allow the carbonaceous material of the sawdust to be released. A typical cycle for my sleeves is as follows. The dried sleeves are placed in the kiln at ambient temperature. Thereafter the kiln is heated from ambient temperature to 500°F in the first 24 hours. In the second 24 hours the temperature is progressively increased from 500° to 900°F. In the third 24 hour period the temperature is increased from 900° to 1200°F. Thereafter the sleeves are brought to a temperature of approximately 1500°F and held at that temperature for 40 to 60 hours. During this time a blue smoke is evident. This blue smoke which is substantially heavier than the normal blue smoke encountered at this temperature comes about from the burning of the carbonaceous material of the sawdust. Thereafter the sleeves are taken to 1800° for 24 hours and then to 2000° where the sleeves are held for approximately 24 additional hours.

If the material is not held at approximately 1500°, a carbon block will form in the center of the sleeve and the carbon will be sealed within the sleeve causing poor performance in use.

A sleeve made in accordance with my invention is illustrated in the sole FIGURE. The sleeve generally designated 10 is cylindrical in form and has an opening 13 extending axially through the sleeve member to accommodate the stopper rod. A shoulder 14 extends outwardly from one end of the sleeve 10 and the sleeve includes a mating recess 15 at the other end thereof. The shoulder 14 and the mating recess 15 assure a tight-fitting engagement of adjacent sleeves when they are placed in end to end relationship along the stopper rod.

The surface 11 of the sleeve 10 is substantially imperforate since it is composed of primarily the clay fines which have worked their way to the surface during processing. The core of the sleeve 10 includes a plurality of voids 16 which are randomly spaced and discontinuous and quite small as a result of the screening of the sawdust prior to mixing. The thorough mixing of the clays and the sawdust results in the random and discontinuous spacing of the voids.

The following Example 1 is an example of a mix which was made in accordance with my process and tested in service.

EXAMPLE 1

Mix: 65% Thomas Plastic Fireclay
22% Reese Flint Clay
13% Sleeve Grog

To this mix was added: moistened hardwood sawdust, 40% by volume. Ratio: 6 parts clay mix to 4 parts moistened screened sawdust.

The sleeves made in accordance with the mix of Example 1 were formed and burned in the manner set forth hereinabove. They performed substantially better in service as compared to the standard refractory clay sleeves. The stopper rod temperature was substantially reduced with my sleeve to the degree that the difference in temperature could be visually ascertained. In addition, the shock resistance of the sleeve was improved. Whereas a cold standard sleeve introduced into a chamber at 2000°F for 30 minutes displayed numerous cracks, my sleeve exhibited no cracks at all under identical circumstances. While there was slightly greater penetration of the molten metal into my low density sleeve, the refractory was not washed thereby and the stopper rod was protected over an extended duration of time.

My low density sleeves are some 20% lighter than the standard sleeve thereby making them easier to handle and more economic to ship. More importantly, the maintenance on the stopper rod has been minimized since the stopper rods are better protected as a result of the increased insulating properties of the sleeve.

Sleeves made of high alumina refractories may also be utilized with my concept by adding a waste combustible such as sawdust thereto and following the general procedure set forth in my process. I have found that improved properties result where the combustible is sawdust collected from hardwood cuttings.

I claim:

1. A low density refractory clay stopper rod sleeve having a substantially imperforate surface and a core containing a plurality of randomly spaced internal and discontinuous small voids, said bulk density of the sleeve being less than 2.0 gr./cc.

2. A low density stopper rod sleeve having a substantially imperforate surface and a core containing a plurality of randomly spaced internal and discontinuous small voids in the as fired condition and a bulk density of less than 2.0 grs./cc, said sleeve made from a mix comprising about six parts by volume refractory clay mix to four parts low temperature combustible waste material not exceeding 10 mesh.

3. The sleeve of claim 2 wherein the refractory clay mix comprises about 65% plastic fireclay, 22% flint clay and 13% sleeve grog and the combustible waste material comprises sawdust, said density in the as fired condition being 1.60 to 1.85 gr./cc.

4. The sleeve of claim 2 wherein the sawdust is from hardwood.

* * * * *